US008836579B2

(12) United States Patent
Allam et al.

(10) Patent No.: US 8,836,579 B2
(45) Date of Patent: Sep. 16, 2014

(54) TRACKING METHOD COMBINING A PASSIVE RADAR AND OTHER SENSORS

(75) Inventors: Sébastien Allam, Antony (FR); Nicolas Millet, Villebon sur Yvette (FR); Mathieu Klein, Gif sur Yvette (FR)

(73) Assignee: Thales (FR)

( * ) Notice: Subject to any disclaimer, the term of this patent is extended or adjusted under 35 U.S.C. 154(b) by 278 days.

(21) Appl. No.: 13/502,906

(22) PCT Filed: Oct. 20, 2010

(86) PCT No.: PCT/EP2010/065825
§ 371 (c)(1),
(2), (4) Date: Apr. 19, 2012

(87) PCT Pub. No.: WO2011/048158
PCT Pub. Date: Apr. 28, 2011

(65) Prior Publication Data
US 2012/0206300 A1    Aug. 16, 2012

(30) Foreign Application Priority Data

Oct. 20, 2009    (FR) ..................................... 09 05030

(51) Int. Cl.
*G01S 3/02*    (2006.01)
*G01S 13/87*    (2006.01)
*G01S 13/00*    (2006.01)

(52) U.S. Cl.
CPC ............... *G01S 13/003* (2013.01); *G01S 13/87* (2013.01); *G01S 12/726* (2013.01)
USPC ....................................................... 342/453

(58) Field of Classification Search
USPC ........................................................ 342/453
See application file for complete search history.

(56) References Cited

U.S. PATENT DOCUMENTS

| 6,995,705 | B2 * | 2/2006 | Bradford et al. | ................. 342/95 |
| 2004/0257270 | A1 * | 12/2004 | Poullin | ......................... 342/159 |
| 2008/0088508 | A1 | 4/2008 | Smith | |

FOREIGN PATENT DOCUMENTS

FR    2909773    6/2008

OTHER PUBLICATIONS

International Search Report for PCT/EP2010/065825 dated Jan. 19, 2011.
"Distributed Multi-Sensor Multi-Target Tracking with Feedback", Khawsuk W. et al.; American Control Conference, 2004.
"A New Active and Passive Asynchronous Fusion Tracking of Maneuvering Target" Zhang Wei et al., Sixth International Symposium on Instrumentation and Control Technology: Sensors, Automatic Measurement, Control, and Computer Simulation, Nov. 8, 2006.
"MMW Collocated Detectors by Fusing Active and Passive Detection", Information Fusion, 2002, Proceedings of the Fifth International Conference.

* cited by examiner

*Primary Examiner* — Harry Liu
(74) *Attorney, Agent, or Firm* — Snell & Wilmer L.L.P.

(57) ABSTRACT

A method is disclosed for merging detection information produced by various sensors of a detection system formed by a passive radar system including various bistatic bases and by an external sensor. The method includes two processing phases. During the first phase, for each bistatic base of the passive radar bistatic plots produced by that bistatic base are first merged with bistatic plots produced on the basis of plots transmitted by the external sensor and projected into the bistatic base concerned. Then, by associating all the bistatic bases, bistatic tracking is applied to the merged bistatic plots and unmerged bistatic plots coming from the external sensor. During the second phase a cartesian tracking is generated on the basis of bistatic plots that contributed to forming the bistatic tracks.

9 Claims, 4 Drawing Sheets

TRACKING METHOD COMBINING A PASSIVE RADAR AND OTHER SENSORS

CROSS-REFERENCE TO RELATED APPLICATIONS

This application is a U.S. national phase filing under 35 U.S.C. §371 of PCT/EP2010/065825 filed Oct. 20, 2010, the entire contents of which is incorporated herein by reference.

FIELD

The invention concerns the general field of radar tracking and of merging detection information produced by a plurality of sensors of different kinds. It concerns in particular improving the tracking capabilities of a passive radar (RP) thanks to the use of tracking information obtained from external sensors (for example active radars).

BACKGROUND

Multi-radar, or more generally multi-sensor, data merging strategies are based on merging detection information generated by each sensor in a cartesian frame of reference common to all the sensors. In principle, these strategies take no account of the bistatic character of the measurements provided when one of these sensors is a passive radar. They thus correspond to sub-optimum merging solutions for this type of sensor.

Information delivered by different sensors may be merged either at the individual detection (merging of plots) level or at the tracking (merging of tracks) level. It is known that the first of these strategies is that which provides the better performance, at the cost of greater complexity than the second. Moreover, given that for a passive radar system to be able to deliver consistent cartesian tracks (i.e. tracks sufficiently pertinent to be merged with data coming from other sensors), it is necessary for the detected targets to be detected simultaneously at a plurality of the bistatic bases that constitute its configuration (ideally at least three bases), a track merging type approach runs the risk of proving detrimental.

It should further be noted that the formation of tracks in a passive radar system is preceded by various processing steps aiming in particular to associate with each other radar plots (i.e. detections) formed on the basis of a plurality of bistatic bases. Such a configuration thus offers possibilities, not yet exploited, of merging detection information coming from different types of sensors in a manner different from that generally employed. The present invention aims to define a merger scheme making best possible use of the tracking internal architecture of a passive radar to incorporate therein exogenous information (coming from other sensors) likely to improve tracking quality and/or to accelerate tracking.

SUMMARY

One object of the invention is to propose a solution enabling merging of multi-sensor data in the most efficacious manner possible in the particular situation where one of the sensors is a passive radar system. In other words, the object of the invention is to improve the rendition of an airborne situation by merging optimally detection of targets by a passive radar and those coming from other sensors.

To this end the invention consists in a data processing system for merging detection information produced by a passive radar system with detection information coming from an external sensor, the passive radar system including a set of bistatic bases, each bistatic base being defined by a receiver and an opportunistic transmitter, the transmitter including a plurality of transmission channels to which correspond reception channels in the receiver, the receiver producing a bistatic plot, or RP bistatic plot, for each detection produced for a given channel, and transmitting these plots to the system, the RP bistatic plots transmitted being grouped as a function of the channel in which the corresponding detection was produced, the external sensor transmitting to the system temporally chained plots, forming external tracks or SE tracks, assigned an identifier. The method of the invention includes at least:

first SE tracking means for transforming each SE plot delivered by the external sensor into a set of bistatic plots synchronized to the measurement times of the passive radar RP, or SE bistatic plots, each SE bistatic plot being associated with a given bistatic base, and into an SE cartesian plot;

merging means for merging, for each of the bistatic bases concerned, the RP bistatic plots produced for the various channels relating to that base and the SE bistatic plots associated with that base to form merged plots, a merged plot being assigned a set of attributes determined by the nature of the RP and/or SE bistatic plots merged to form the plot concerned;

second tracking means for producing, for each bistatic base, bistatic tracks of different types by temporal chaining of merged plots, a bistatic track being assigned a set of attributes determined by the nature of the latest merged plot to be associated with it; the merged plots used to form a bistatic track being assigned an attribute indicating that they have been used to this effect;

cartesian third tracking means for producing, for all bistatic bases formed on the basis of the same receiver, RP or RP+SE cartesian tracks and SE cartesian tracks, these cartesian tracks being produced on the basis of the RP merged plots produced by the second bistatic tracking means and the SE cartesian plots produced by the SE first tracking means, a cartesian track being assigned a set of attributes determined by the nature of the plots, RP and/or RP+SE merged plots and SE cartesian plots, that contribute to its formation and its maintenance.

In one embodiment of the method of the invention the SE tracking means are configured to transform each SE plot delivered by the external sensor into a set of bistatic plots or SE bistatic plots synchronized to the measurement times of the passive radar RP, the coordinates of each SE bistatic plot being obtained by projecting the coordinates associated with the SE plot concerned into the frame of reference associated with the bistatic base concerned.

In one embodiment of the method of the invention the SE tracking means are further configured to produce, from the plots produced by the external sensor, SE cartesian plots the attributes of which are defined relative to a given cartesian frame of reference, each SE cartesian plot being assigned the identifier of the SE track to which the SE plot at the origin of the SE cartesian plot concerns contributed.

In one embodiment of the method of the invention the merging means produce and transmit to the bistatic tracking means merged bistatic plots divided into three categories:

RP merged plots constituted only on the basis of RP bistatic plots produced on the basis of each channel of the radar system, the attributes of each RP merged plot being determined on the basis of the attributes of the RP that gave rise to it;

RP+SE merged plots constituted on the basis of RP bistatic plots and an SE bistatic plot, the attributes of each RP+SE merged plot being determined from the attributes of the RP bistatic plots and SE bistatic plots that gave rise to it;

SE bistatic plots that have not been merged being transmitted as they stand.

In one embodiment of the method of the invention the bistatic tracking means are configured to produce bistatic tracks divided into two categories:

RP bistatic tracks produced only on the basis of RP merged plots, each RP bistatic track being constituted by all RP merged plots used to initialize it and maintain it;

RP+SE bistatic tracks produced on the basis of RP merged plots and SE merged plots, each RP+SE bistatic track being constituted by all the +SE merged plots used to initialize and maintain it.

The bistatic tracking means are also configured to identify merged plots not used to produce bistatic tracks.

In one embodiment of the method of the invention the cartesian tracking means include:

means for updating the cartesian tracks already formed by attempting to associate those tracks with the plots transmitted by the bistatic tracking means and with SE cartesian plots (19) transmitted by the SE tracking means;

means for initializing RP cartesian tracks and initializing RP+SE and SE cartesian tracks, this initialization being effected on the basis of plots not associated by the preceding association means, means for maintaining RP and RP+SE cartesian tracks already formed;

means for maintaining SE cartesian tracks already formed;

the means for maintaining RP and RP+SE cartesian tracks already formed including means that merge RP and RP+SE tracks already formed and new RP and RP+SE tracks provided by the initialization means.

According to the invention, the cartesian tracks are assigned a cartesian identifier, the cartesian tracking means include means that assign an identifier to each new cartesian track initialized and that manage over time the list of identifiers already assigned by reassigning identifiers assigned to tracks that have been eliminated to new tracks that have been initialized.

In one embodiment of the method of the invention the cartesian tracking means further include means for testing the consistency of the RP+SE cartesian tracks formed, these means determining the likelihood of the associations effected and delivering three groups of tracks:

RP+SE cartesian tracks for which consistency is established,

RP or SE requalified cartesian tracks, these requalified tracks being derived from RP+SE cartesian tracks for which consistency has not been established.

In a preferred embodiment the consistency test consists in comparing the current position associated with the RP+SE track concerned and the result of a location operation effected on the basis of the bistatic distances of the RP merged plots associated with that track.

BRIEF DESCRIPTION OF THE DRAWINGS

The features and advantages of the invention will be better appreciated thanks to the following description, which discloses the invention via a particular embodiment taken by way of nonlimiting example and refers to the appended figures.

DESCRIPTION OF THE VARIOUS EMBODIMENTS

The following description explains the general structure of the system of the invention for a surveillance system, taken by way of nonlimiting example, including a passive radar (RP), also known as a passive coherent locator (PCL), constituted of a receiver and using a plurality of opportunistic transmitters, and a complementary sensor, or external sensor (SE). Thus a passive radar system may be associated with an automatic dependant surveillance broadcast (ADSB) technology, a primary radar, a secondary radar or a lidar, for example, configured to deliver tracks in a standard geographical frame of reference of the World Geodetic System 1984 (WGS84) type.

In the embodiment described, each opportunistic transmitter transmits signals on a plurality of frequency channels, each channel corresponding to a defined band of frequencies. The passive radar system (RP), here composed of a single receiver, is associated with a single external sensor. However, it is of course possible to design a system of the invention suited to a more restricted set-up in which each opportunistic transmitter transmits on only one channel; similarly, it is also possible to design a larger system adapted to a set-up including a multi-receiver passive radar and a plurality of external sensors. The scope of the invention is thus not limited to the generic structure explained by way of example.

Figure 1:
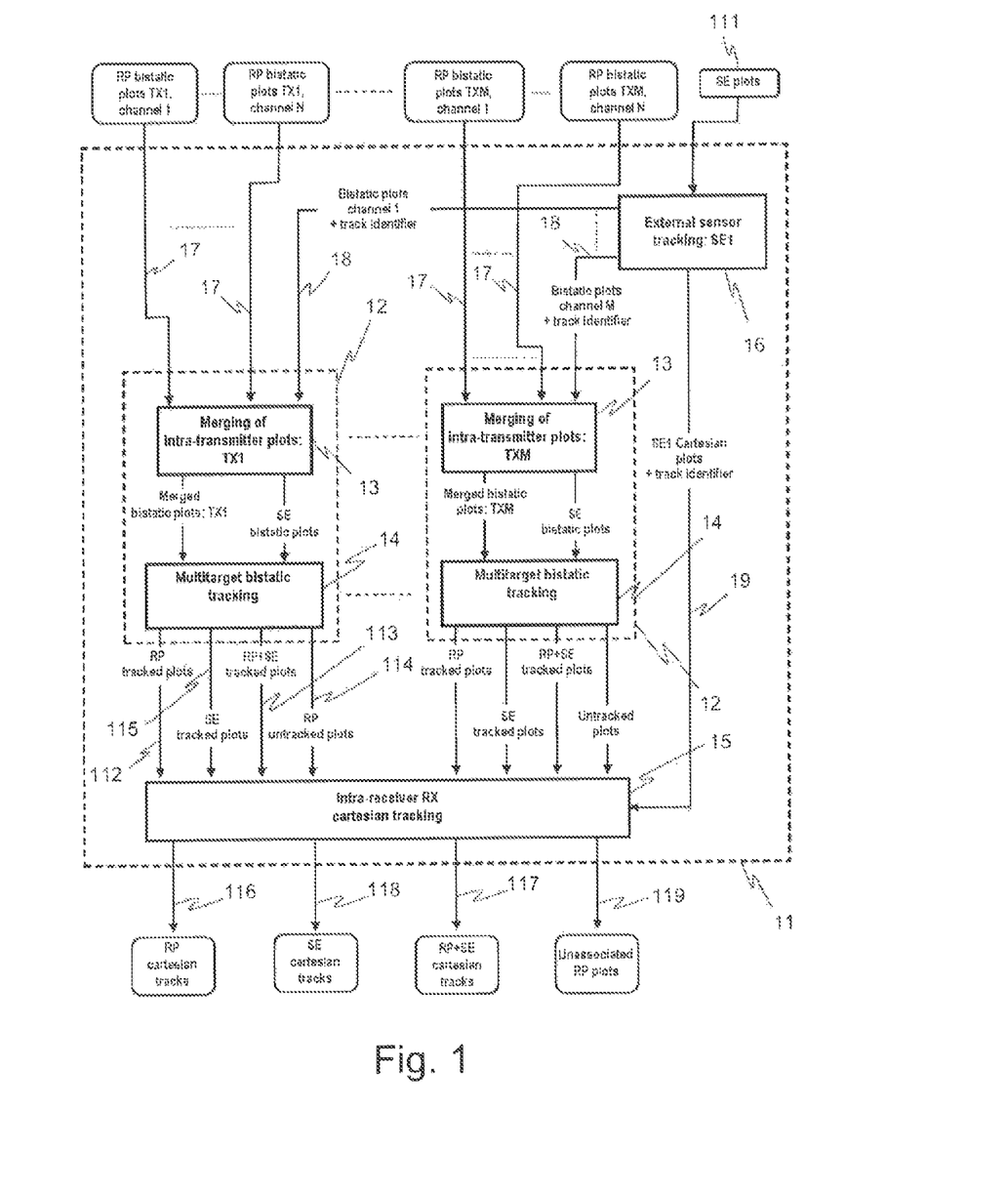
FIG. 1 is a general block diagram showing the various means constituting the system of the invention and the data exchanged by the various means.

As shown in FIG. 1, the system 11 of the invention includes a plurality of processing channels 12 each including means 13 for merging bistatic plots and bistatic tracking means 14. Each of the processing channels 12 delivers the results of the processing carried out to one of the global tracking means 15 or cartesian tracking means, the role of which is to construct and to maintain cartesian tracks on the basis of merged bistatic plots produced by each of the processing channels. According to the invention, these cartesian tracks are defined in a common cartesian frame of reference, for example a frame of reference centered at the position of the receiver of the passive radar (RP) system.

According to the invention, the various functions executed by the various processing channels and those effected by the cartesian tracking means may be effected by any appropriate known processing method. Also, the operation of the various means is not described in detail here. On the other hand, of relevance here are the structural and format characteristics of the data produced by each of the means employed, which structure and format represent characteristics that are essential for enabling implementation of the architecture of the invention.

As shown in FIG. 1, the system 11 of the invention is globally configured to process data supplied by the passive radar system RP in the form of bistatic plots. The bistatic plots coming from the same bistatic base, i.e. having for their origin the result of the processing of a signal of a frequency channel belonging to the bistatic base, are processed here by the same processing channel 12. Thus the system of the invention includes as many processing channels 12 as the passive radar system RP includes opportunistic transmitters. Moreover, the opportunistic transmitter transmitting on different frequency channels, the receiver includes a plurality of receiving channels able to produce bistatic plots. Consequently each processing channel 12 of the invention includes, as the figure shows, a plurality of input channels 17 on which the bistatic plot merging means 13 carry out the merging operation.

The system of the invention is moreover configured to take account in each processing channel 12 of detection information produced by an external sensor (SE) 111. Here it is assumed that this detection information is transmitted to the system in the form of tracks defined either in its own frame of reference or in a geographical frame of reference, for example. Each track is formed of a temporally chained series of plots produced by the external sensor and assigned an identifier. To this end it includes means 16 for formatting the information transmitted by the external sensor so as to constitute in particular bistatic plots the attributes of which relate to the various bistatic bases of the passive radar system RP. The plots constituted in this way form at the level of each of the processing channels a complementary input channel 18 separated from the radar channels 17.

Figure 2:
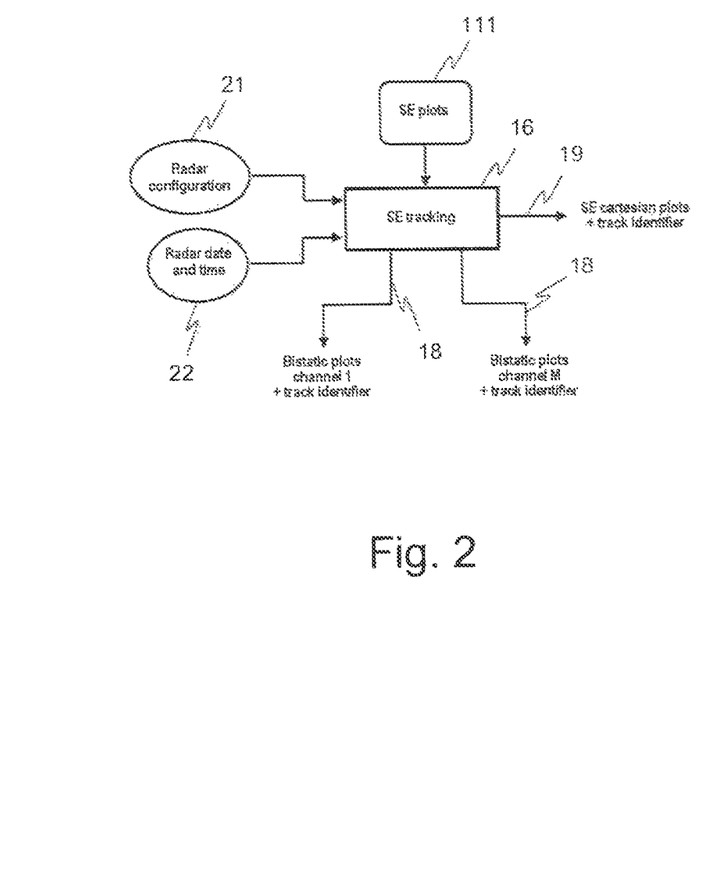
FIG. 2 is a block diagram showing the data exchanged by the means responsible for tracking plots transmitted to the system by an external sensor.
Figure 3:
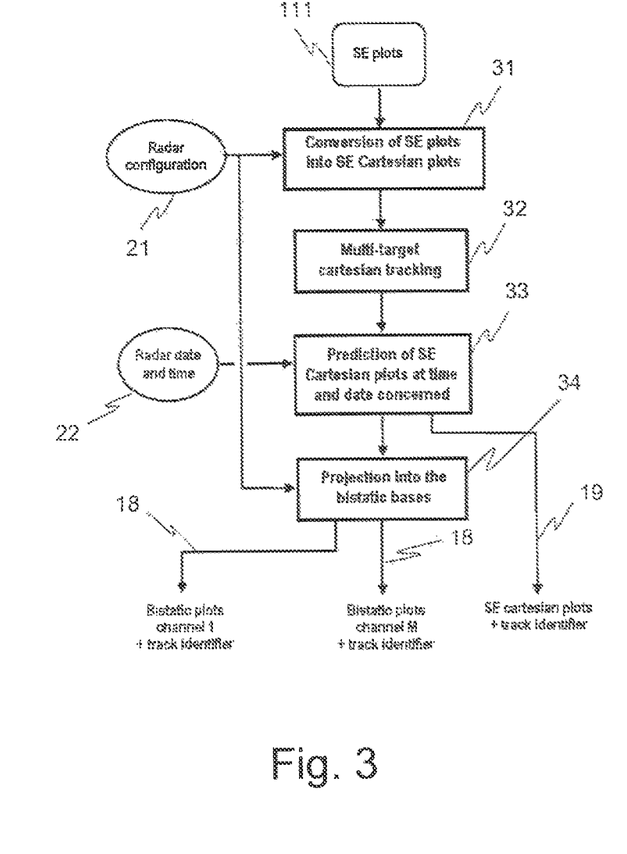
FIG. 3 is a block diagram of the processing effected by the means responsible for tracking plots transmitted to the system by an external sensor.

FIGS. 2 and 3 show the operating principle of the means 16 for conditioning data delivered to the system 11 by an external sensor.

FIG. 2 identifies the characteristics of the inputs/outputs of the means 16 for tracking the plots delivered by the external sensor (SE).

As already stated, the external sensor is here assumed to transmit tracks corresponding to various aircraft that it has detected or that have been brought to its attention. As the figure shows, each track is formed here by temporally chaining (i.e. associating over time) the plots 111, each plot corresponding to the detection of an object at a given time. Each track is moreover assigned an identifier or SE identifier that is specific to it. The plots 111 formed by the external sensor, or SE plots, and constituting a track are transmitted to the means 16 accompanied by the identifier of the corresponding track.

According to the invention the function of the SE tracking means 16 is to form from each SE plot received bistatic plots the attributes of which correspond to the various processing channels 12 employed. This function consists mainly in projecting the attributes of the SE plot concerned, position, speed, etc., expressed in a general frame of reference, the WGS84 geographical frame of reference, for example, in the various bistatic bases of the radar system RP. Information 21 relating to the configuration of the passive radar RP is to this end sent to the SE tracking means. This information includes the positions of the receiver and the various opportunistic transmitters in a cartesian frame of reference. From a unique channel for transmitting plots over which the plots SE pass in transit, the SE tracking means 16 thus produce a plurality of channels 18 over which bistatic plots formed from SE plots are transmitted to the various processing channels 12. Thereafter, if the system comprises M processing channels, an SE plot gives rise to M bistatic plots. It should be noted here that according to the invention the projection of an SE plot in the various bistatic bases may be effected by any appropriate means.

Note also that in that the bistatic plots formed from the SE plots are intended to be merged with bistatic plots produced by the passive radar system RP, to yield a pertinent merger it is necessary for the SE tracking means 16 to be in a position to measure to determine at what times the bistatic plots must be transmitted to the various processing channels. This is why the SE tracking means 16 are configured so as to take into account this date and time information 22 that serves as a time reference common to the various means constituting the system of the invention.

FIG. 3 shows in diagrammatic form the various operations carried by the SE tracking means 16, together with their temporal chaining. The SE tracking means provide four main operations.

The first operation 31 consists in expressing the attributes of the plots transmitted by the external sensor SE in a common cartesian frame of reference taken as the reference, for example a frame of reference centered at the phase center of the receiver constituting the passive radar system RP. To this end the SE tracking means 16 receive, as stated above, information 21 on the geographical position of this phase center. This operation produces SE plots the attributes of which are no longer expressed in the frame of reference of the external sensor but in the reference cartesian frame of reference of the passive radar RP.

The second operation 32 carried out by the SE tracking means 16 consists in forming and maintaining tracks on the basis of cartesian SE plots produced by the operation 31, each cartesian SE plot being already assigned the identifier of the initial SE plot attaching the latter to a track formed by the external sensor. According to the invention the operation of creating and maintaining cartesian tracks employs linear filtering, for example Kalman filtering, the state model of which may be a constant speed or acceleration model, affected by a mean noise defined so that the weight of the measurements is always preponderant over the result of the state equations. Moreover, the filter algorithm used is chosen so that a prediction of the state of a cartesian track is produced in the momentary absence of plots that can contribute to the maintenance of that track. The operation 32 thus produces cartesian tracks that are maintained at the timing rate of appearance of SE plots transmitted by the external sensor.

Note that the plots used to form cartesian SE tracks being assigned identifiers characterizing the SE tracks to which they are attached, creation and maintenance of cartesian SE tracks are simplified. A given track may generally be maintained considering only plots that have the same identifier, plots associated with other identifiers being a priori intended for the maintenance of other cartesian SE tracks. A cartesian SE track is moreover materialized, in the usual way, by the list of the cartesian SE plots that are associated with it, this list being added to over time, i.e. as and when the SE plots are transmitted by the external sensor.

The object of the third operation 33 is to establish synchronization of the detection information constituted by the SE plots transmitted by the external sensor and detection information constituted by the bistatic plots transmitted by the receiver of the passive radar system RP. The passive radar system produces bistatic plots with timing defined by its own functioning. The same applies to the external sensor. Consequently, synchronization proves necessary, failing which the operation of merging plots could lead to the merging of non-contemporaneous plots and to the formation of erroneous bistatic tracks. According to the invention, synchronization is effected taking the passive radar system RP as a reference.

Thereafter, for each existing cartesian SE track, there are estimated the values of the attributes of the cartesian SE plot corresponding to the track concerned for each time for which a bistatic radar plot, or bistatic RP plot, is produced (this operation is effected by prediction, for example).

The synchronous cartesian SE plots produced in this way are used by the SE tracking means to generate bistatic SE plots, as stated above. Moreover, they are also chained temporally to form cartesian SE tracks as FIG. 3 shows.

For its part the fourth operation 34 consists in effecting the projection as such of the cartesian SE plots into the various bistatic bases and delivering bistatic SE plots synchronous with the bistatic RP plots. This projection relates both to the mean values and the uncertainties of the cartesian SE attributes.

Note that the bistatic SE plots transmitted to the various bistatic processing channels 12 are characterized by different attributes, for example the bistatic distance and speed, and the azimuth, the values of these attributes each being assigned an uncertainty. Moreover, each bistatic SE plot is characterized by the identifier of the SE track which gave birth to it.

Figure 4:
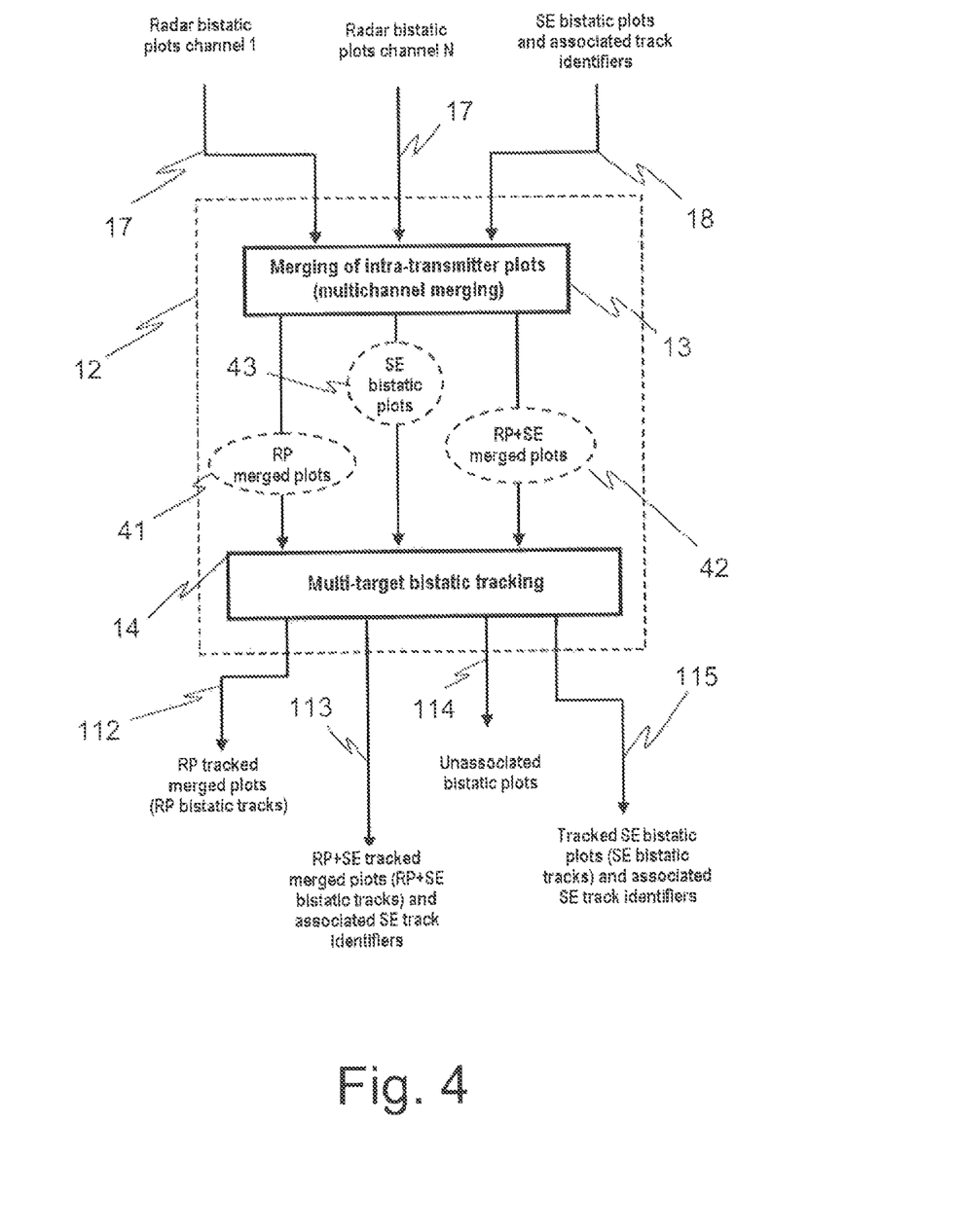
FIG. 4 is a block diagram showing the data exchanged by the means responsible for merging bistatic plots originating from the various channels of the same bistatic base and the means responsible for effecting bistatic tracking on the basis of these merged bistatic plots.

FIG. 4 shows the signals exchanged by the means 13 and 14 constituting each of the bistatic processing channels 12 of the invention. It also shows the input/output signals exchanged with the other means.

As stated above each channel 12 is dedicated to a given transmitter forming a bistatic base of the passive radar system RP. It includes means 13 configured to merge bistatic plots 17 from all sources (passive radar RP or external sensor SE) with each other.

According to the invention, the bistatic plots may be merged by any known plot merging method. This method must nevertheless be implemented in such a way as to produce three distinct groups of merged plots:

a group 41 formed of merged plots resulting from merging bistatic RP plots only or RP merged plots;

a group 42 formed of merged plots resulting from merging bistatic RP plots and bistatic SE plots, or RP+SE merged plots;

a group 43 formed of non-merged bistatic SE plots.

Note that if a plurality of SE is used, the identifier will be modified to integrate the origin of the sensor.

According to the invention the merged radar plots, or RP merged plots, produced by the merging means 13 are characterized by attributes of the same kind as the attributes characterizing the bistatic RP plots that have been merged. These attributes are typically the bistatic distance, the bistatic speed and the azimuth. With each of these attributes is associated an accuracy (the standard deviation of the measurement). The RP+SE merged plots are characterized by three types of attribute:

attributes characterizing the plot resulting from merging RP and SE bistatic plots identified as belonging to the same target;

attributes characterizing the plot resulting from merging RP plots identified as belonging to the same target, and the identifier of the SE track associated with the bistatic SE plot involved in the merger.

The RP merged plots are characterized by a single type of attribute resulting from merging RP plots identified as belonging to the same target. For their part the SE plots are characterized by their bistatic attributes and the number identifying the SE track.

As FIG. 4 shows, a bistatic processing channel also includes means 14 for effecting multitarget bistatic tracking consisting mainly in forming and maintaining bistatic tracks from RP, RP+SE and SE merged plots formed by the merging means 13.

According to the invention, the formation and maintenance of bistatic tracks by the bistatic tracking means 14 may be effected by using any appropriate known method, which method must nevertheless be implemented in such a way as to define three distinct groups of bistatic tracks:

RP bistatic tracks
RP+SE bistatic tracks
SE bistatic tracks

Figure 5:
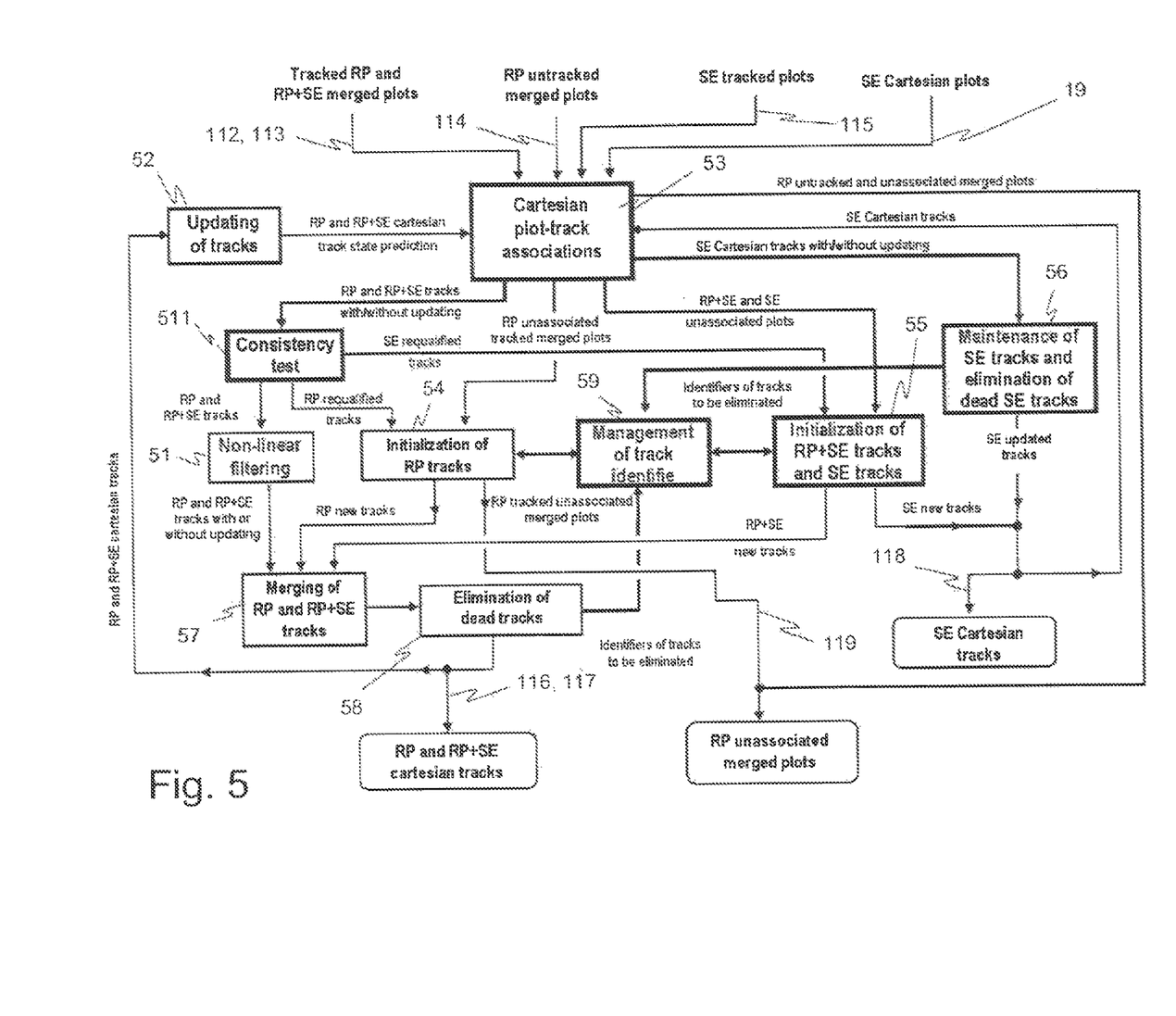
FIG. 5 is a block diagram showing the processing effected by the means responsible for constituting cartesian tracks from merged bistatic plots and formed bistatic tracks.

Each track being materialized by a structure corresponding to the estimate over time of the bistatic parameters of the target that it represents, that structure containing:

an indicator specifying the nature of the track (RP, SE or RP+SE), a cartesian identifier (typically a number) of the track, assigned to the track when it was created (by the means 55 or 54), a vector representing the state of the track at the current time, a matrix representing the covariance of the state at the current time, the RP, RP+SE or SE plot that was used to update the track at the current time, the SE identifier if the track was updated with an RP+SE type merged plot or by an SE type bistatic plot, the attribute resulting from merging the RP plots if the track was updated by an RP+SE merged plot.

According to the invention, the nature of a track is fixed by the nature of the last type of bistatic plot that was used to update it.

According to the invention, the method used is implemented:

to identify the RP merged plots that have not contributed to the formation of any track, to initialize immediately an SE type track on the basis of SE plots not contributing to any existing SE track.

Again according to the invention, the bistatic tracking means 14 thus group plots into various categories, each plot being identified by the category to which it belongs, RP merged plots 112 having contributed to the formation of RP bistatic tracks, SE bistatic plots 115 having contributed to the formation of an SE bistatic track, RP+SE merged plots 113 having contributed to the formation of RP+SE bistatic tracks, or RP merged plots 114 that have not contributed to forming any bistatic track. Plots identified in this way are transmitted as shown in FIG. 1 to the cartesian tracking means 15. All plots contributing to bistatic tracks are transmitted accompanied by the identifier of that track.

FIG. 5 is a block diagram of the various operations carried out by the cartesian tracking means 15. The main function of these means consists globally in forming and maintaining tracks referenced in a general cartesian frame of reference, or cartesian tracks. These tracks are formed from bistatic tracks formed by the various processing channels 12 that constitute the system on the basis of bistatic plots not used to form these bistatic tracks and SE cartesian tracks produced by the SE tracking means 16.

From a functional point of view, the cartesian tracking means include two processing chains the function of which consists in forming and maintaining RP cartesian tracks and RP+SE cartesian tracks, on the one hand, and SE cartesian tracks, on the other hand.

The remainder of the text describes the organization and the overall operation of the system of the invention without necessarily detailing the operation of the various means, some of which means may use known methods to carry out their functions.

According to the invention, the Cartesian tracking means are mainly configured to form and to maintain cartesian tracks. This function is assured firstly by generating and maintaining cartesian tracks, and then merging tracks formed in this way when this is possible. The result is the formation of merged tracks which may be classified into three groups:

RP cartesian tracks 116;
RP+SE cartesian tracks 117;
SE cartesian tracks 118.

RP cartesian tracks are initialized, maintained and managed by means 54, 51 and 52 on the basis of plot-track associations produced by association means 53. In the same way, SE and RP+SE cartesian tracks are initialized by means 55 on the basis of plot-track associations produced by association means 53.

According to the invention, the plot-track association means may use known association methods not described in detail here. However, these methods are used taking into account the various types of track formed and to minimize track interruptions, notably by assuring the transitions between the different types of track, an RP+SE cartesian track being liable to be transformed at any time into an RP or SE cartesian track, for example.

The association methods depend in particular on the types of plots and tracks that are associated at a given time. Accordingly, if the association relates to SE plots and SE cartesian tracks only, the association may simply be based on the identifier of the SE track produced by the external sensor, or SE identifier, an SE bistatic plot being associated with an existing SE cartesian track if that identifier is the same for the bistatic SE plot and the SE cartesian track to be associated.

From a functional point of view, plot-track association is effected in two steps:

a first step consists in attempting and achieving, by resolving any plot-track association conflicts, when possible, the association of merged bistatic plots 112 to 115 and cartesian tracks of the same type, RP bistatic plots 112 and 114 with RP cartesian tracks, RP+SE bistatic plots 113 with RP+SE cartesian tracks, and SE plots 115 or 19 with SE cartesian tracks.

a second step consists in attempting and achieving, when possible, by resolving any conflicts, the association of free tracks (i.e. tracks not associated with plots) with free plots of different types.

According to the invention, the first association step is carried out by first setting aside from any association SE cartesian plots already associated with RP+SE tracks. The following three association operations are then carried out:

Association of RP+SE cartesian tracks already formed with merged RP+SE plots 113. This operation enables definition of the associated RP+SE cartesian tracks (i.e. tracks "associated with plots"), free RP+SE cartesian tracks (i.e. tracks "not associated with plots"), and free RP+SE merged plots (i.e. plots "not associated with tracks");

Association of SE cartesian tracks already formed with tracked SE bistatic plots 115 or cartesian SE plots 19. This operation enables definition of associated SE cartesian tracks, free SE cartesian tracks, and free SE bistatic plots;

Association of RP cartesian tracks already formed with RP plots 112 or 114. This operation enables definition of associated RP cartesian tracks, free RP cartesian tracks, and free RP merged plots.

According to the invention, the first association step may be carried out using standard plot/track association algorithms.

Again according to the invention, the second association step consists in carrying out crossed associations between free tracks and free plots between different types. These associations employ the following operations:

Whether some of the free SE cartesian tracks have SE identifiers corresponding to free RP+SE merged plot identifiers is verified. If a correspondence is established, the free SE cartesian track is requalified as an RP+SE cartesian track without its cartesian identifier changing. The RP+SE merged plot that is associated with the new RP+SE track is then eliminated from the list of free RP+SE merged plots.

Whether some of the RP+SE cartesian tracks free of associations have SE identifiers that correspond to the SE identifiers of free SE bistatic plots is verified. If a correspondence is established, the free RP+SE cartesian track is requalified as an SE cartesian track without its cartesian identifier changing. The SE bistatic plot that is associated with the new SE track is then eliminated from the list of free SE bistatic plots.

In a similar manner to the first step, whether some of the free RP cartesian tracks may be associated with free RP+SE merged plots is tested. If an association is possible, the free RP cartesian track is requalified as an RP+SE cartesian track without its cartesian identifier changing. The RP+SE merged plot that is associated with the new RP+SE track is then eliminated from the list of free RP+SE merged plots.

In a similar manner to the first step, whether some of the free RP+SE cartesian tracks may be associated with free RP merged plots is tested. If an association is possible, the free RP+SE cartesian track is requalified as an RP cartesian track without its cartesian identifier changing. The RP merged plot that is associated with the new radar track is then eliminated from the list of free RP merged plots.

In a similar manner to the first step, whether some of the free SE cartesian tracks may be associated with free RP merged plots is tested. If an association is possible, the free SE cartesian track is requalified as an RP cartesian track without its cartesian identifier changing. The RP merged plot that is associated with the new radar track is then eliminated from the list of free RP merged plots.

In a manner similar to the first step, whether some of the free RP cartesian tracks may be associated with free SE bistatic plots is tested. If an association is possible, the free radar cartesian track is requalified as an SE cartesian track without its cartesian identifier changing. The SE bistatic plot that is associated with the new SE track is then eliminated from the list of free SE bistatic plots.

As shown in FIG. 5, the association means 53 therefore deliver, in addition to the updated cartesian tracks, cartesian tracks that have not been updated and merged plots free of any association that contribute to the creation of the group 119 of unassociated RP merged plots, the latter being used, for example, in configurations of the invention in which the passive radar RP is a multi-receiver radar, for receiver to receiver associations. The RP+SE merged plots and the SE bistatic plots free of associations are transferred to means 55 responsible for initialization of new tracks, RP+SE cartesian tracks or SE cartesian tracks, while the RP merged plots are transferred to means 54 responsible for initialization of new radar cartesian tracks. The initialization methods used, which are known in themselves, are not described here. It is nevertheless to be noted that the initialization means 55 create new RP+SE or SE cartesian tracks for each free plot transmitted. The state vector of the RP+SE or SE track formed in this way is initialized directly by copying information from the cartesian plot 19 produced by the module 16 having the same SE identifier.

According to the invention, the RP Cartesian tracks and the RP+SE cartesian tracks are transmitted to means 511 the role of which is to verify the consistency of the RP+SE tracks, i.e. that the association of plots and tracks is well founded. This is verified by comparing the current position associated with the track concerned and the result of a location operation effected on the basis of the bistatic distances of the RP merged plots associated with the track. This location is carried out considering the distances associated with the RP bistatic plots involved in updating the track concerned. If the location based on these plots is deemed compatible with the position associated with the track, the external sensor and the radar system are then considered as delivering measurements that are in agreement and the associations are validated. On the other hand, if this is not the case, the means 511 carry out an analysis to determine if some of the plots concerned are erroneous (i.e. incorrectly associated). If some plots appear erroneous, they are then excluded from the set of plots to be associated with the track concerned. Moreover, if all the RP bistatic plots are considered erroneous, the RP+SE cartesian track concerned is transformed into an SE cartesian track and if possible into an RP cartesian track. Only one of the RP and SE cartesian tracks formed in this way retains the cartesian identifier of the dismantled RP+SE cartesian track:

if the bistatic RP plots initially associated with the RP+ES cartesian track came from at least three different bistatic bases, and if the bistatic distances associated with the RP plots that contributed to the track lead to initializing a correct RP cartesian track, the latter takes over the identifier of the dismantled RP+SE cartesian track.

if not, the identifier of the dismantled RP+SE cartesian track is taken over by the SE cartesian track.

For their part, the SE cartesian tracks are maintained by means 56 the function of which consists in updating the state vector, and the associated covariance matrix, of each SE cartesian track before proceeding to a merger (association means 53) with newly transmitted plots. Here maintaining the track is advantageously simple, the state vector being constructed by simply copying the most recent of the associated SE cartesian plots transmitted in the stream 19.

It is to be noted that, in contrast to what happens for the RP and RP+SE cartesian tracks, for which a lifetime conventionally follows the time at which the track appears in prediction (i.e. free but still kept alive), if an SE cartesian track proves at any given time to be free of any association, it is immediately destroyed and its cartesian identifier is made available again.

According to the invention, the cartesian tracking means also include means 57 for merging RP cartesian tracks and RP+SE cartesian tracks if this is possible. This merging may be carried out using any known track merging method. These means are associated with means 58 the function of which is to eliminate dead RP and RP+SE cartesian tracks, i.e. tracks that are no longer associated with new RP or RP+SE merged plots and which are not merged with other RP or RP+SE tracks. According to the invention, these tracks are no longer taken into consideration and their cartesian identifiers are made available again.

According to the invention, the cartesian tracking means further include means 59 for managing the cartesian identifiers assigned to the various tracks formed. In principle, each initialized track is assigned a cartesian identifier, for example a number, that it retains for as long as it remains alive. If a cartesian track is considered dead by one of the means 56 and 58 concerned, then those means transmit to the means 59 the cartesian identifier of the track declared dead. This identifier is then assigned thereafter to a new track.

The invention claimed is:

1. A data processing system for merging detection information produced by a passive radar system with detection information coming from an external sensor, the passive radar system including a set of opportunistic transmitters and receivers forming a set of bistatic bases, each bistatic base being defined by a receiver and an opportunistic transmitter, the transmitter including a plurality of transmission channels to which correspond reception channels in the receiver, each bistatic base producing a bistatic plot, or RP bistatic plot, for each detection produced for a given channel, and transmitting these plots to the system, the RP bistatic plots transmitted being grouped as a function of the channel in which the corresponding detection was produced, the external sensor transmitting to the system temporally chained plots, forming external tracks or SE tracks, assigned an identifier, said processing system including at least:

first SE tracking means for transforming each SE plot delivered by the external sensor into a set of bistatic plots synchronized to the measurement times of the passive radar RP, or SE bistatic plots, each SE bistatic plot being associated with a given bistatic base, and into an SE cartesian plot;

merging means for merging, for each of the bistatic bases concerned, the RP bistatic plots produced for the various channels relating to that base and the SE bistatic plots associated with that base to form merged plots, a merged plot being assigned a set of attributes determined by the nature of the RP and/or SE bistatic plots merged to form the plot concerned;

second tracking means for producing, for each bistatic base, RP, SE or RP+SE bistatic tracks by temporal chaining of RP merged plots with RP merged plots or of SE plots with SE plots or even by temporal chaining of RP merged plots with RP, merged plots and SE plots, a bistatic track being assigned a set of attributes determined by the nature of the latest merged plot to be associated with it; the merged plots used to form a bistatic track being assigned an attribute indicating that they have been used to this effect;

cartesian third tracking means for associating the bistatic tracks produced separately for each of the bistatic bases and producing, for all bistatic bases formed on the basis of the same receiver, RP or RP+SE cartesian tracks and SE cartesian tracks, these cartesian tracks being produced on the basis of the RP, SE and RP+SE merged plots that contributed to the formation of the bistatic tracks produced by the second bistatic tracking means and the SE cartesian plots produced by the SE first tracking means, a cartesian track being assigned a set of attributes determined by the nature of the plots, RP and/or RP+SE merged plots and SE cartesian plots, that contribute to its formation and its maintenance.

2. The system of claim 1, wherein the SE tracking means are configured to transform each SE plot delivered by the external sensor into a set of bistatic plots or SE bistatic plots synchronized to the measurement times of the passive radar RP, the coordinates of each SE bistatic plot being obtained by projecting the coordinates associated with the SE plot concerned into the frame of reference associated with the bistatic base concerned.

3. The system of claim 1, wherein the SE tracking means are further configured to produce, from the plots produced by the external sensor, SE cartesian plots the attributes of which are defined relative to a given cartesian frame of reference, each SE cartesian plot being assigned the identifier of the SE track to which the SE plot at the origin of the SE cartesian plot concerns contributed.

4. The system of claim 1, wherein the merging means produce and transmit to the bistatic tracking means merged bistatic plots divided into three categories:

RP merged plots constituted only on the basis of RP bistatic plots produced from each channel of the radar system, the attributes of each RP merged plot being determined from the attributes of the RP bistatic plots that gave rise to it;

RP+SE merged plots constituted on the basis of RP bistatic plots and an SE bistatic plot, the attributes of each RP+SE merged plot being determined on the basis of the attributes of the RP bistatic plots and SE bistatic plots that gave rise to it;

SE bistatic plots that have not been merged being transmitted as they stand.

5. The system of claim 4, wherein the bistatic tracking means are configured to produce bistatic tracks divided into two categories:

RP bistatic tracks produced only on the basis of RP merged plots, each RP bistatic track being constituted by all RP merged plots used to initialize it and maintain it;

RP+SE bistatic tracks produced on the basis of RP merged plots and SE merged plots, each RP+SE bistatic track being constituted by all +SE merged plots used to initialize it and maintain it;

these means being also configured to identify merged plots not used to produce bistatic tracks.

6. The system of claim 5, wherein the cartesian tracking means include:

means for updating the cartesian tracks already formed by attempting to associate those tracks with the plots transmitted by the bistatic tracking means and with SE cartesian plots transmitted by the SE tracking means;

means for initializing RP cartesian tracks and initializing RP+SE and SE cartesian tracks, this initialization being effected on the basis of plots not associated by the preceding association means, means for maintaining the RP and RP+SE cartesian tracks already formed;

means for maintaining the SE cartesian tracks already formed;

the means for maintaining the RP and RP+SE cartesian tracks already formed including means that merge RP and RP+SE tracks already formed and new RP and RP+SE tracks provided by the initialization means.

7. The system of claim 6, wherein, the cartesian tracks being assigned a cartesian identifier, the cartesian tracking means include means that assign an identifier to each new cartesian track initialized and that manage over time the list of identifiers already assigned by reassigning identifiers assigned to tracks that have been eliminated to new tracks that have been initialized.

8. The system of claim 6, wherein the cartesian tracking means further include means for testing the consistency of the RP+SE cartesian tracks formed, these means determining the likelihood of the associations effected and delivering three groups of tracks:

RP+SE cartesian tracks for which consistency is established,

RP or SE requalified cartesian tracks, these requalified tracks being derived from RP+SE cartesian tracks for which consistency has not been established.

9. The system of claim 8, wherein the consistency test consists in comparing the current position associated with the RP+SE track concerned and the result of a location operation effected on the basis of the bistatic distances of the RP merged plots associated with that track.

* * * * *